Feb. 3, 1925.
R. A. MEADOWS
SELF SKIMMING SIRUP PAN
Filed April 14, 1923
1,524,837
2 Sheets-Sheet 2
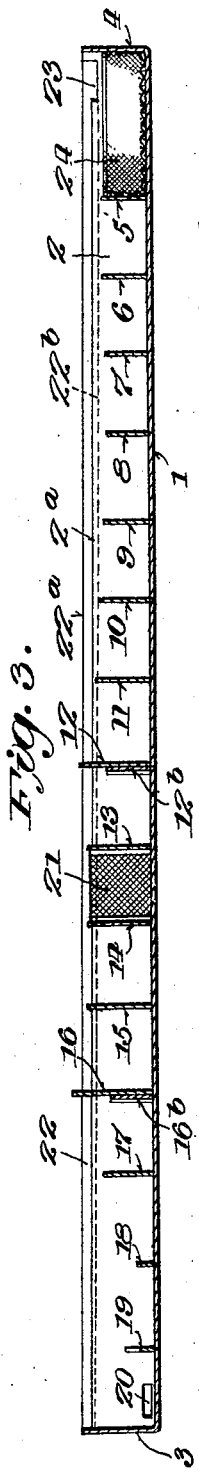
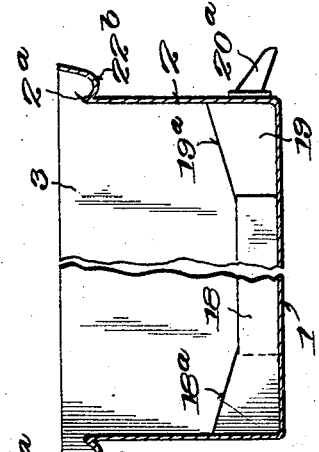
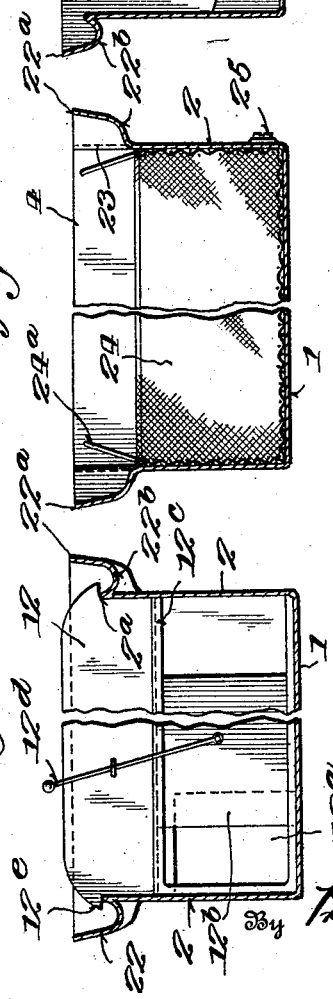
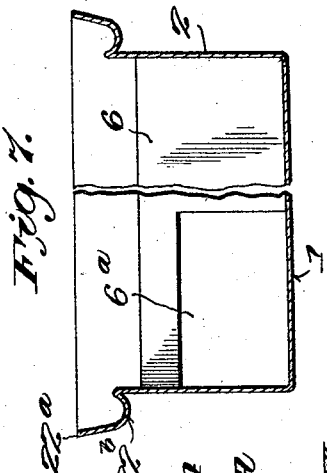
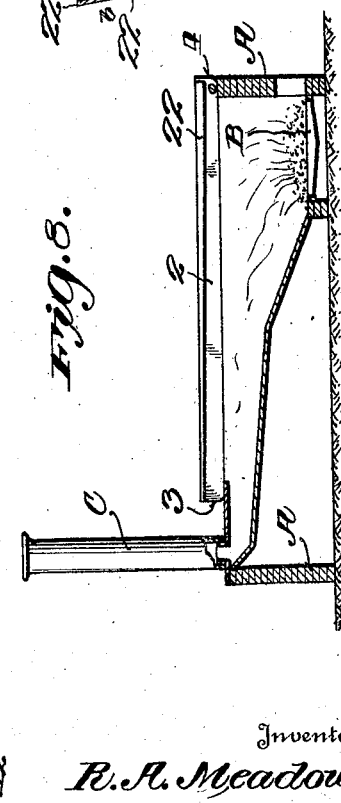
Inventor
R. A. Meadows,
By Prentiss, Stone & Boyden,
Attorneys Patented Feb. 3, 1925.

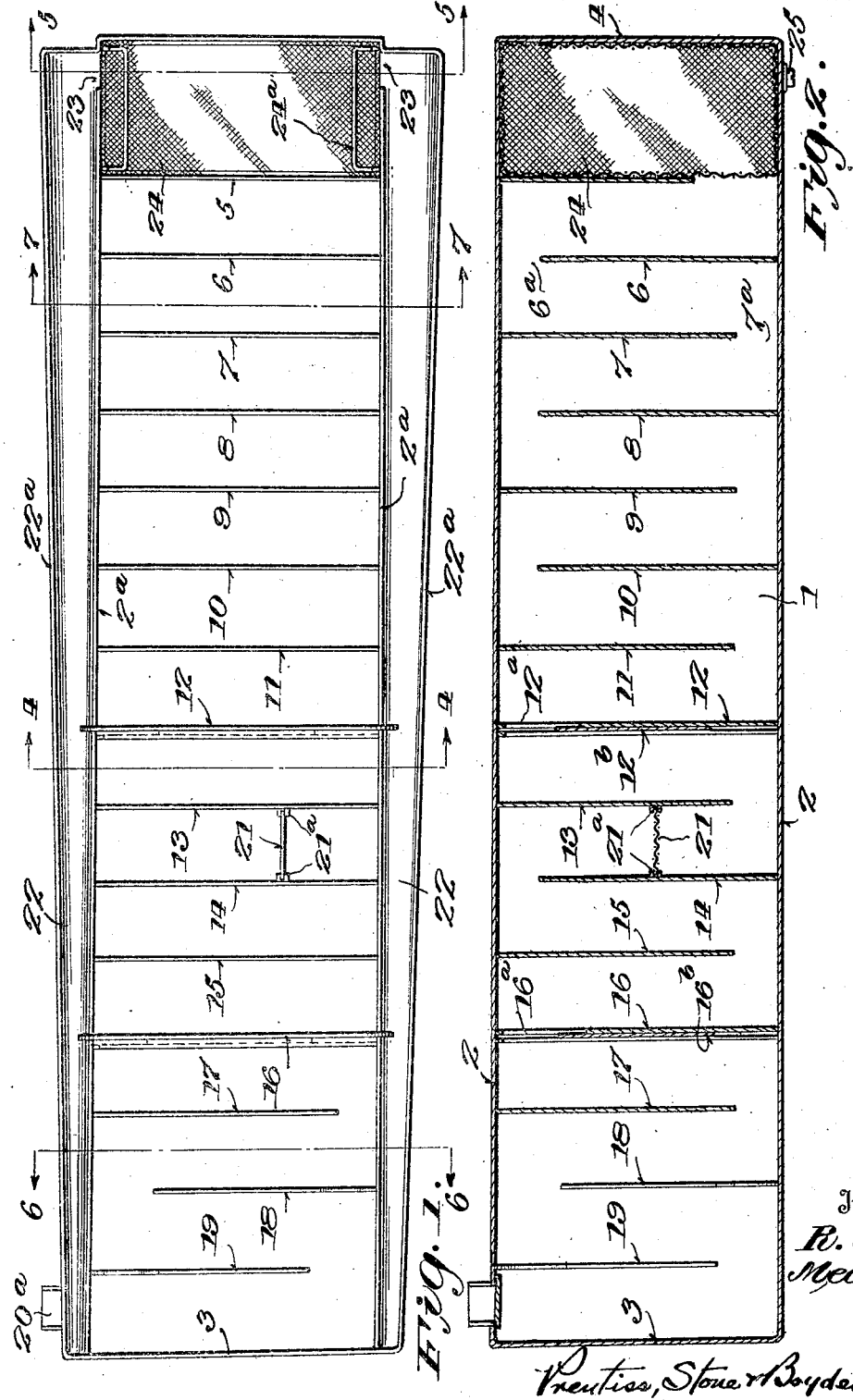

1,524,837

UNITED STATES PATENT OFFICE.

ROBERT ASA MEADOWS, OF CARMONA, TEXAS.

SELF-SKIMMING SIRUP PAN.

Application filed April 14, 1923. Serial No. 632,152.

*To all whom it may concern:*

Be it known that I, ROBERT A. MEADOWS, a citizen of the United States, residing at Carmona, in the county of Polk and State of Texas, have invented certain new and useful Improvements in Self-Skimming Sirup Pans, of which the following is a specification.

This invention relates to evaporating pans such as are used for making sirup from cane juice and the like, and more especially to that type of pan comprising a flat shallow receptacle having transverse partitions arranged therein so as to cause the liquid to flow back and forth across the pan as it travels from one end to the other thereof.

The objects of the invention are to provide a pan of this character having improved means for automatically skimming the liquid and returning juice into the pan, while separating and collecting the scum for removal, and also having an improved arrangement of strainers and partitions whereby the process of cooking or evaporating the juice and the skimming thereof is rendered more efficient.

In order that the invention may be readily understood, reference is had to the accompanying drawings, forming part of this specification, and in which:—

Fig. 1 is a plan view of my improved pan;

Fig. 2 is a sectional plan thereof, taken on a line below the level of the skimming troughs, hereinafter referred to;

Fig. 3 is a vertical longitudinal section through the pan, parts of which are shown in elevation;

Figs. 4, 5, 6 and 7 are transverse sections on the lines 4—4, 5—5, 6—6 and 7—7 of Fig. 1, respectively, looking in the direction of the arrows, these figures being on a larger scale, and being partly broken away; and Fig. 8 is a sectional elevation on a small scale, showing the method of mounting such a pan on a furnace.

Referring to the drawings in detail, my improved pan is relatively narrow and long in shape, suitable dimensions being found in practice to be three and one-half by twelve feet. Although, in many cases, the sides may be constructed of wood, I have, for convenience, illustrated in the drawings the entire pan as being made of sheet metal.

The pan comprises a flat bottom 1, sides 2, and ends 3 and 4, 3 being the back and 4 the front of the pan which is over the furnace. As an illustration, I may say that the sides may be made five inches in height at the back, preferably sloping to four inches in height at the front, the rear end 3 being six inches high.

Extending across the pan from side to side are a series of transverse partitions dividing the pan into compartments. These partitions are shown as fifteen in number, and are designated by the reference numerals 5, 6, 7, 8, 9, 10, 11, 12, 13, 14, 15, 16, 17, 18, 19, the partition 5 being the one nearest the front end of the pan.

This first partition 5 is preferably about three inches in height, or an inch below the sides of the pan, and the partitions 6, 7 and 8 are the same height. Partitions 9, 10 and 11 are progressively a little higher.

Each of the partitions 5, 6, 7, 8, 9, 10 and 11 is provided at alternate ends with an opening or notch at the bottom, similar to the opening $6^a$ in the partition 6, as shown in Fig. 7, such opening being preferably about two and one-half inches high and four inches wide. It will be understood that in practice, the liquid runs through these notches or openings and flows back and forth between the partitions in a zig-zag path, as is common in this art.

Partition 12, which is more clearly shown in Fig. 4, extends well above the sides of the pan and is provided with ears $12^e$ which overhang the upper edges of the sides. The partition 12 is provided with a notch or opening $12^a$ in one of its lower corners, which is arranged to be closed by means of a sliding gate $12^b$, mounted in suitable ways or guides $12^c$ and operated by means of a pivoted lever $12^d$.

Partitions 13, 14 and 15 extend preferably slightly above the upper edges of the sides of the pan, and are, of course, also provided with openings or notches in alternate corners. The partition 16 is similar to 12 and is provided with a sliding gate $16^b$ for closing the opening therethrough.

Partition 17 is again preferably somewhat lower than the sides of the pan, while partitions 18 and 19 are of special construction, as shown in Fig. 6. Each of these partitions has a sloping upper edge, as indicated at $18^a$ and $19^a$, extending a short distance from the respective sides of the pan, and then continues with a straight upper edge across the pan to within a few inches of the opposite side, such straight edge being relatively low, preferably at a height not greater than one and one-half inches.

20 designates the opening for the discharge of the finished sirup, a suitable spout 20ª being provided on the outside of the pan.

Between two of the partitions near the middle of the pan, as, for example, between the partitions 13 and 14, I mount a screen or strainer 21. This may be slidably held in guides 21ª, as clearly shown in the drawings. The object of this strainer is to prevent impurities and foreign matter from getting into the finished sirup. It is much easier and more practical to strain the half finished liquid at some such intermediate point as this than to endeavor to strain finished sirup after it has become thick and viscous.

The gates 12ᵇ and 16ᵇ are for the purpose of controlling the flow of the liquid, as may be required to insure the proper cooking and evaporation thereof, the proper rate of flow, of course, being dependent upon the existing heat of the fire.

One of the main features of the invention consists in combining with an evaporating pan constructed as described, troughs for automatically removing the scum from the sirup and returning it to the front end of the pan. I provide one of these troughs on each side of the pan, as indicated at 22, the troughs being preferably narrower at the rear than at the front end, as shown in Fig. 1, and communicating through a notch or opening 23 with the first or front compartment of the pan.

The outer edges 22ª of these troughs are preferably somewhat higher than the side edges 2ª of the pan, as shown in Fig. 3, while the bottom of the trough is so shaped that it slopes gradually and uniformly from the rear toward the front end. As an illustration of the degree of slope which may be employed, I may state that in practice I have found good results can be obtained by making the bottom 22ᵇ of the trough approximately half an inch below the upper edge 2ª of the sides at the rear end of the pan, and by making such bottom one inch from the top edge of the sides at the front of the pan. It will be recalled that the side edges 2ª themselves have a slope of approximately one inch from back to front, so that the relation above described for the troughs gives them a fall of approximately an inch and a half in their length when the pan is level. It is customary, however, to slightly elevate the rear end of the pan, and this will give a somewhat greater slope to the troughs.

In any event, the slope is sufficient to cause the scum which overflows the side edges of the pan into the trough to flow toward the front end of the trough and be discharged into the front compartment of the pan, it being understood that it is this compartment into which the raw juice is fed.

In order to catch the scum and prevent it from being carried on through the pan again with the raw juice, I provide a strainer in the shape of a wire basket or similar receptacle 24, and this is made of such size and shape as to neatly fit the front compartment of the pan. The basket is preferably provided with suitable handles 24ª, by means of which it may be lifted out when necessary. The raw juice will serve to dissolve a considerable portion of the scum, but the undesirable and unusable portions can be easily disposed of from time to time by removing the basket and emptying it It will therefore be observed that not only do I provide a strainer 21 for straining the partly cooked juice and thus eliminating foreign matter from the finished sirup, but I also provide a second strainer in the form of the wire basket 24, for straining the scum when it is returned to the front end of the pan.

The object of having the ears 12ᵉ projecting over the upper edges of the sides 2ª and extending into the troughs 22, as shown in Fig. 4, is to prevent the scum from passing by the partition 12, or the partition 16, as the case may be, and to cause such scum as may lodge against these partitions to flow laterally into the troughs. Between the partition 16 and the rear 3 of the pan, it is not necessary to hold back the scum, since whatever may be present goes over the sides into the troughs.

Referring to Fig. 8, it will be seen that the pan is usually mounted upon a furnace comprising brick work or the like A, and having a fire place B and a smoke stack C, so arranged that the products of combustion pass under the whole length of the pan. The fire should be so controlled that no boiling of the liquid takes place in the first four or five compartments.

In operating my improved pan, it is first filled with raw juice throughout, and gate 16ᵇ is then closed.

Preferably, part of the juice is then drawn out of sirup outlet 20 until it is only (say) one inch deep at back of pan. This causes the thin layer of juice in the rear compartments to boil first, and such boiling causes the liquid to rise and boil over into the side troughs, as described, and is continued until the sirup in the rear compartments is sufficiently cooked, when the outlet 20 is opened, and the finished sirup drawn off. At the same time, more juice is admitted into the rear compartments through the gate 16ᵇ.

The raw juice, as it passes from the basket 24 into the successive compartments, becomes hotter and hotter and soon commences to boil. In each compartment, the liquid boils a little higher but does not boil over into the troughs until it passes the partition 12 because the cold juices coming in at the front end of the pan tend to keep the boiling down, and in the second place, the partitions 9, 10 and 11 are made progressively higher but are kept below the level of the trough, and, due to the slope in the pan from the rear end to the front end, partitions 5, 6, 7 and 8 are also progressively higher. This arrangement of the partitions 5 to 11 inclusive causes the froth and scum to boil over from one compartment into the next in front, back to the basket 24.

The gate 12ᵇ in the partition 12 regulates the flow of the liquid into the compartments beyond partitions 12 and up to the partition 16. In these compartments the scum does not boil over from one into the other but owing to the height of the partitions 13, 14 and 15, it passes into the troughs on the sides of the pan. The ears 12ᵉ on the partition 12 further insure the passage of the scum into the troughs and aid in leveling any froth which passes by, thus preventing it from entering the compartment in front of the partition 12.

The purpose of having the partitions 18, 19, so low, as described, is to permit the steam to freely escape, so that the operator can clearly see the nature of the sirup being drawn off. The relatively high sloping portions, 18ᵃ and 19ᵃ, however, are opposite the entrance to the preceding compartments, and thus prevent the juice from overflowing these partitions into the sirup as the juice enters these compartments.

What I claim is:—

1. In a sirup pan, having a skimming trough extending along each side thereof, and a series of transverse partitions in said pan, a plurality of said partitions having portions projecting over the upper edges of the sides of the pan into said troughs.

2. The combination with a sirup pan having a sirup outlet at one end, of a series of transverse partitions extending across the pan and dividing it into compartments, said partitions being cut away at alternate ends to provide a zig-zag path for the liquid, the partitions near the outlet end of the pan being lower throughout their middle portions than the other partitions, and having their end portions, opposite the cut away ends of adjacent partitions, higher than their middle portions, whereby the overflowing of the liquid at such ends as it enters the respective compartments is prevented.

3. In a sirup pan having skimming troughs extending along each side thereof and inclined toward the front end of said pan, and transverse partitions dividing said pan into compartments, a series of said partitions having their upper edges progressively higher but below the sides of the pan, whereby any scum formed on the surface of a high boiling liquid is made to flow back over the partitions to the front end of said pan and into a removable woven wire basket instead of into said troughs, a second series of said partitions following said first named series having their upper edges higher than the sides of the pan whereby any scum formed on the surface of a high boiling liquid is made to pass over the sides of the pan into said inclined troughs.

In testimony whereof I affix my signature.

ROBERT ASA MEADOWS.